United States Patent [19]
Yaegashi

[11] Patent Number: 5,796,684
[45] Date of Patent: Aug. 18, 1998

[54] RECONFIGURABLE DUPLICATOR SYSTEM

[75] Inventor: Akira Yaegashi, San Diego, Calif.

[73] Assignees: Sony Corporation, Tokyo, Japan; Sony Electronics Inc., Park Ridge, N.J.

[21] Appl. No.: 752,453

[22] Filed: Nov. 15, 1996

[51] Int. Cl.$^6$ ..................................................... G11B 17/22
[52] U.S. Cl. ................................................. 369/30; 369/84
[58] Field of Search ................................. 369/84, 83, 32, 369/47, 30, 34; 360/73.02, 73.03, 15

[56] References Cited

U.S. PATENT DOCUMENTS

| 5,349,477 | 9/1994 | Shuto | 369/84 |
| 5,610,893 | 3/1997 | Soga et al. | 369/84 |
| 5,640,535 | 6/1997 | Suzuki et al. | 369/84 |

FOREIGN PATENT DOCUMENTS

| 4-370566 | 12/1992 | Japan | 369/84 |
| 2274193 | 7/1994 | United Kingdom | 369/84 |

OTHER PUBLICATIONS

CD-ROM Professional, Nov. 1996, vol. 9, No. 11, Optical Storage Systems and Supplies advertisement (page un-numbered).
CD-ROM Professional, Nov. 1996, vol. 9, No. 11, JVC Information Products Company of America advertisement (page un-numbered).
CD-ROM Professional, Nov. 1996, vol. 9, No. 11, dataDisc CD-ROM Solutions advertisement (page un-numbered).
CD-ROM Professional, Nov. 1996, vol. 9, No. 11, Anyware Distribution advertisement (page un-numbered).
CD-ROM Professional, Nov. 1996, vol. 9, No. 11, Isomedia, Inc. advertisment (page un-numbered).
CD-ROM Professional, Nov. 1996, vol. 9, No. 11, Champion Dupicators Incorporated advertisement (p. 129).
CD-ROM Professional, Nov. 1996, vol. 9, No. 11, Microboards of America advertisement (p. 134).

Primary Examiner—Nabil Hindi
Attorney, Agent, or Firm—Limbach & Limbach L.L.P.

[57] ABSTRACT

A flexible system for recording data onto compact disc recordable media includes a plurality of system modules. Each system module includes a CD-ROM drive for reproducing data from a master compact disc; a SCSI controller for receiving data from an input terminal of a SCSI interface; and a plurality of CD-R recorders. Each CD-R recorder of a system module records data onto a compact disc recordable medium simultaneously with each other CD-R recorder of the system module records data onto a compact disc recordable medium. The SCSI controller is further for controlling the system module to be in one of a standalone operating mode and a slave operating mode. When a system module is in the standalone operating mode, the data recorded onto the compact disc recordable media by the plurality of CD-R recorders is the data reproduced from the master compact disc. When a system module is in the slave operating mode, the recording data recorded by the CD-R recorders onto the compact disc recordable medium is the data received at the input terminal of the SCSI interface.

8 Claims, 4 Drawing Sheets

RECONFIGURABLE DUPLICATOR SYSTEM

TECHNICAL FIELD

The present invention relates to CD-R duplication systems and, in particular, to a CD-R duplication system having a plurality of system modules and operable in three modes wherein, in the common mode, the system modules are all slaves to a master system module and simultaneously duplicate a single CD; in the standalone mode, the system modules all operate independently and each simultaneously duplicates a separate single CD; and a mixed mode where some of the system modules are slaves to the master system module and some of the system modules operate independently.

BACKGROUND

CD duplication is known in the art for duplicating. CD duplication employs a master image of data stored on a CD-ROM master disc (e.g., from the CD-ROM master disc itself or from an image of the CD-ROM master disc stored, e.g., on a magnetic media). The image is copied by recording the data of the image onto a CD-Recordable (CD-R) media. To record onto CD-R media, a laser is used to burn data into a polymer dye layer on the CD-R media. This is in contrast to CD replication, by which a disc is created by first creating a glass master from a premastered image, stampers are created from the glass master, and then discs are pressed with the stamper using an injection molding process.

CD duplication devices can typically duplicate a single master image onto several CD-R media simultaneously. In addition, it is known to employ a plurality of modules operating together on a master/slave principle. For example, a master unit of the ROM-Maker Multidrive system manufactured by JVC is a tower enclosure with a plurality of CD-R recorders that record a disc image reproduced from a hard disc drive housed within the enclosure of the master unit. Slave units of the system are identical to the master unit, except that the slave units do not include hard disc drives. The slave units can be daisy chained together so that a single master image can be duplicated simultaneously onto CD-R media on both the master unit and the slave units.

Thus, the slave units are relegated only to duplicating disc images provided from the hard disc drive of the master unit. The slave units can never operate independently of the master unit. This is particularly disadvantageous in instances where fewer copies of a disc image are required than there are CD-R recorders in the master and slave units combined, such that some CD-R recorders are idle, and it is desired to also duplicate a second disc image.

SUMMARY

A flexible system for recording data onto compact disc recordable media includes a plurality of system modules. Each system module includes a data reproducing means for reproducing data from a master compact disc; a data receiving means for receiving data from an input terminal of an interface means; and a plurality of recording means, each recording means for recording data onto a compact disc recordable medium simultaneously with each other recording means of the system module recording data onto a compact disc recordable medium. Each system module further includes control means for controlling the system module to be in one of a standalone operating mode and a slave operating mode. When a system module is in the standalone operating mode, the data recorded onto the compact disc recordable media by the plurality of recording means is the data reproduced from any master compact disc. When a system module is in the slave operating mode, the recording data recorded by the recording means onto the compact disc recordable medium is the data received from the input terminal of the interface means by the data receiving means.

DETAILED DESCRIPTION

Figure 1:
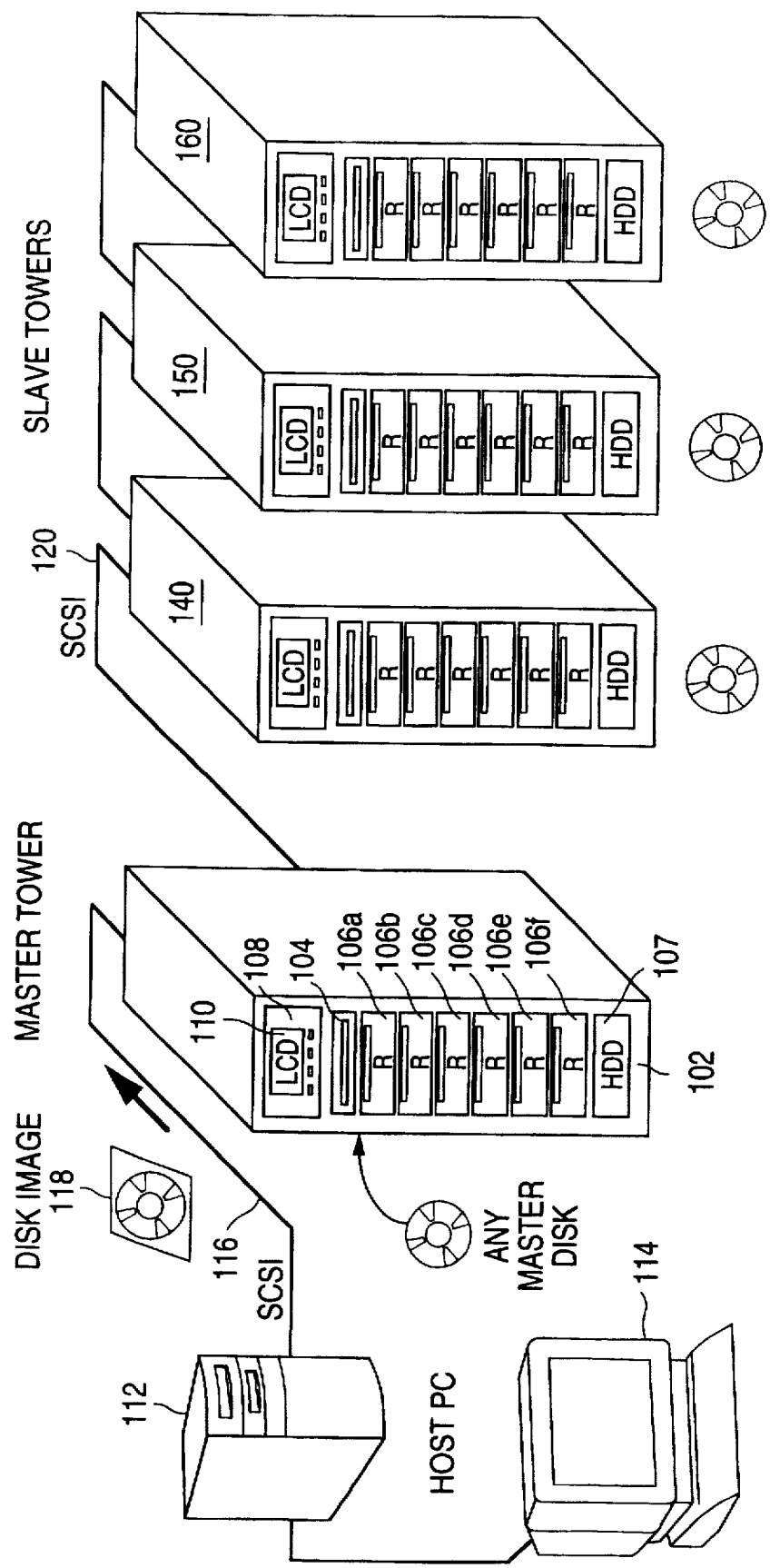
FIG. 1 is a block illustration of a CD-R duplicator system 100 in accordance with a first embodiment of the invention.

A CD-R duplicator system 100 in accordance with a first embodiment of the invention is illustrated in block form in FIG. 1. A master tower 102 includes a CD ROM drive 104, six CD-R drives 106a through 106f, and a hard disk drive 107. The master tower 102 also includes a keypad 108 and liquid crystal display (LCD) 110. A user can manually input commands to control the functions of the master tower 102 via the keypad 108 and LCD 110. Alternately (or in addition) a personal computer 112 (e.g., a personal computer executing the Windows operating system), including a monitor 114, may be connected to control the master tower 102 via a SCSI (small computer systems interface) 116. The master tower 102 also includes a controller (not shown).

The CD-R drives 106a through 106f of the master tower 102 each record data provided from either the CD-ROM drive 104 of the master tower or from a disk image 118 provided from the computer 112 (if the computer is provided). Preferably, if the disk image 118 is provided from the computer 112, it is intermediately stored onto the hard disk drive 107.

A slave tower 140 is connected to master tower 102 via a SCSI 120. Slave towers 150 and 160 are connected to slave tower 140 in a standard SCSI daisy chain configuration. More or fewer slave towers may be provided and connected in the SCSI daisy chain configuration. A tower is defined as being a master tower at system installation time by being loaded with and executing a master control program. The master tower is daisy chained to five slave towers (the slave towers having been loaded with and executing a slave control program) through a SCSI bus interface, for example. The master is set to have SCSI ID 7, the slaves are set to have SCSI ID 1,2,3,4 and 5 respectively.

Figures 3, 4:
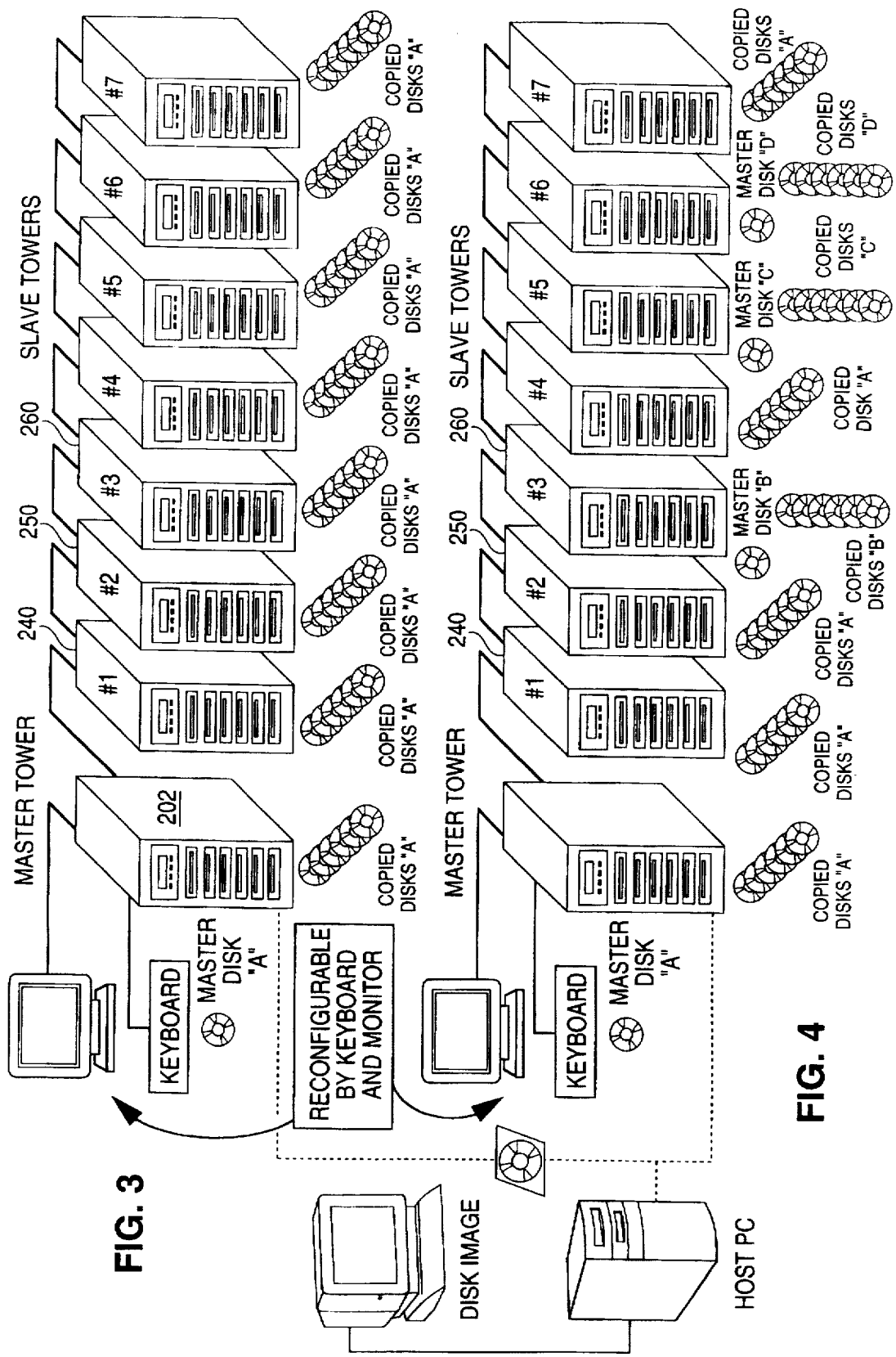
FIG. 3 illustrates the master/slave mode.
FIG. 4 illustrates the hybrid mode.

When the system 100 is in a master/slave mode, a single disc image is recorded on CD-R media within the CD-R drives 106a through 106f of the master tower and, in addition, the same disc image is provided via the SCSI 120 to the slave towers 140, 150 and 160 and recorded on the on CD-R media by the CD-R drives within the towers 140, 150 and 160. The master/slave mode is illustrated in the diagram of FIG. 3. When the system 100 is in the master/slave mode, all of the slave towers 140, 150 and 160 are in the SCSI "target emulation" mode such that all of the slave towers 140, 150 and 160 behave to the master tower 102 as a single SCSI device. 3. A vendor unique SCSI command (Ucmd) is used to communicate between the master and slave towers.

Alternately, the system 100 may operate in a hybrid mode. In the hybrid mode, some of the slave towers 140, 150 and 160 operate in a standalone mode to duplicate separate disc images, while some of the slave towers remain slaves of the host tower 102. The hybrid mode is illustrated in the diagram of FIG. 4.

The system may also be configured such that all of the towers 102, 140, 150 and 160 duplicate a separate disc image. That is, the CD-R devices 106a through 106f of tower 102 duplicates a disc image provided from the CD-ROM drive 104 of the tower 102 or from the computer 112; the CD-R devices of tower 140 duplicate a disc image provided from the CD-ROM drive of the tower 140; the CD-R devices of tower 150 duplicate a disc image provided from the CD-ROM drive of the tower 150; and the CD-R devices of tower 160 duplicate a disc image provided from the CD-ROM drive of the tower 160. In the standalone mode, each tower can be separately controlled via its own keypad and LCD. When it is desired that the system 100 be in the standalone mode.

Figure 5:
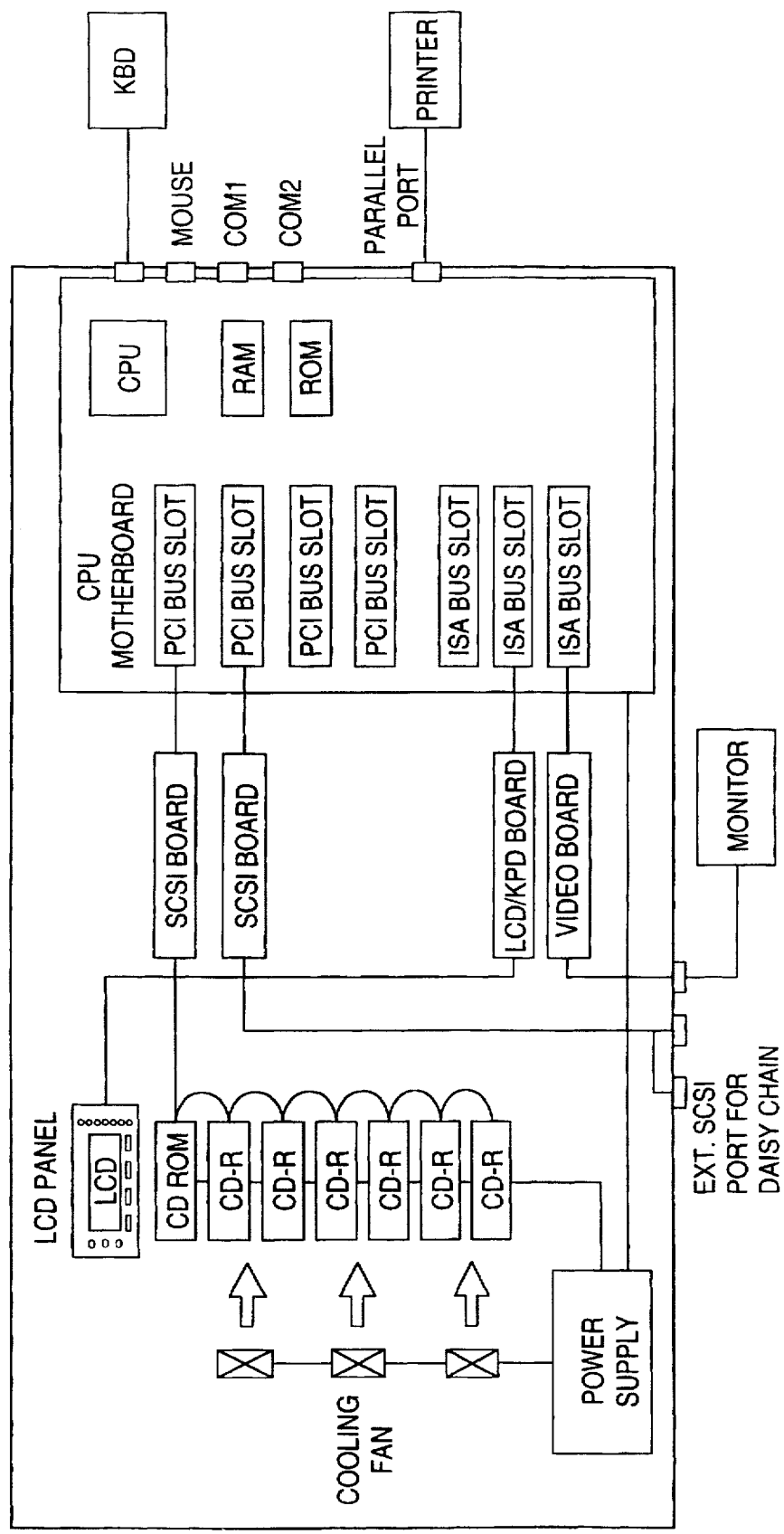
FIG. 5 is a block illustration of the internal circuitry of a tower (either master or slave tower).

Each of the towers 102, 140, 150 and 160 is identical and, so long as it has a "master control program" loaded, can be configured to be a master tower merely by providing the host id of the tower desired to be the "master tower" to the computer 112 and configuring the SCSI controller software being executed by the computer to recognize this tower as the master tower. Of course, the interface must be physically reconfigured to be properly daisy chained. FIG. 5 is a block illustration of the internal circuitry of a tower.

To change the operating mode of a particular slave tower from "slave" to "standalone", a SCSI command is directed to the slave tower from the master tower. A vendor specific Ucmd is required, and following the Ucmd is the action code (Actcode) for the tower to perform when addressed. Thus, the interface command structure has the following format:.

ID#Ucmd Actcode

For example, if the master system wants to set slave tower 5 to run stand-alone mode, and the Ucmd is defined as FF hex, then the master will 'select' the slave tower 5 to logically disconnect it from the master by issuing this command:

05 FF Disc

After receiving the command, the slave control program in slave tower 5 will put the slave tower 5 into disc state and display the state on the LCD of slave 5. The operator then can use slave 5 to duplicate a disk image from the CD-ROM drive of slave 5. Later if the master wants to set slave tower 5 back to common mode to duplicate from the CD-ROM drive of the master tower, the master tower can "reconnect" the slave tower 5 (i.e., put it back into slave mode from standalone mode) using the command:

05 FF Reconnect

Thus, the "disconnect" and "reconnect" can be commanded from the master tower, eliminating the need for an operator to physically go to each slave tower to set its mode (although this would certainly be an option).

Figure 2:
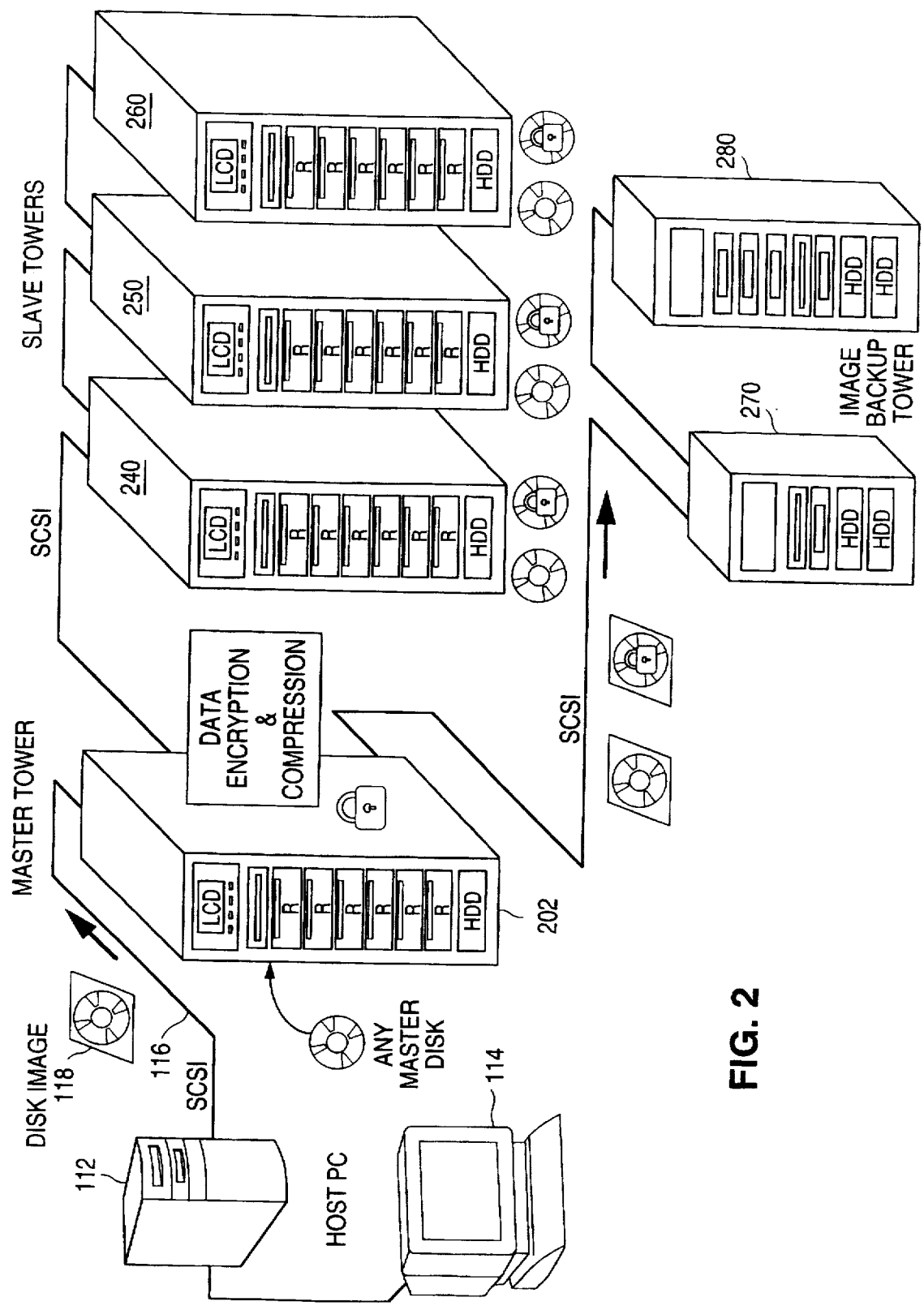
FIG. 2 is a block illustration of a CD-R duplicator system 200 in accordance with an enhanced embodiment of the invention.

A CD-R duplicator system 200 in accordance with an enhanced embodiment of the invention is illustrated in block form in FIG. 2. The system 200 is substantially identical to the system 100 shown in FIG. 1, except that the system 200 includes embedded data encryption and compression circuitry in each of the towers 202, 240, 250 and 260 such that the disc image can be encrypted or compressed before being duplicated onto a CD-R medium. Preferably, the encryption and/or compression is performed by conventional software. Additionally, image backup towers 270 and 280 (each including various recording media such as magneto-optical disc drives, hard disc drives, and/or removable disk drives) are provided for image backup. Then, the system 200 is configurable such that the disc image recorded onto the CD-R media originates from one of the image backup towers rather than from the computer 112 or from the CD-ROM drive of the master tower 202.

What is claimed is:

1. A flexible system for recording data onto compact disc recordable media, the system including:
    a plurality of system modules, each system module including:
        a data reproducing means for reproducing data from a master compact disc;
        a data receiving means for receiving data from an input terminal of an interface means;
        a plurality of recording means, each recording means for recording data onto a compact disc recordable medium simultaneously with each other recording means of the system module recording data onto a compact disc recordable medium;
        control means for controlling the system module to be in one of a standalone operating mode and a slave operating mode, wherein
            in the standalone operating mode, the data recorded onto the compact disc recordable media by the plurality of recording means is the data reproduced from the master compact disc, and
            in the slave operating mode, the recording data recorded by the recording means onto the compact disc recordable medium is the data received from the input terminal of the interface means by the data receiving means.

2. The flexible system as set forth in claim 1, wherein each system module further comprises mode changing means that generates a mode control signal, wherein the control means controls the mode of the system module responsive to the mode control signal.

3. The flexible system as set forth in claim 2, wherein the mode changing means of each system module includes an input means operable by a user for manual input and the mode changing means generates the mode control signal responsive to the manual input.

4. The flexible system as set forth in claim 2, wherein the mode changing means of each system module includes detecting means for detecting completion of recording onto the compact disc recordable media by the plurality of recording means of that system module and generates the mode control signal responsive to the completion being detected.

5. The flexible system as set forth in claim 2, wherein the mode changing means further comprises external interface means for receiving externally generated control signals, wherein the mode changing means generates the mode control signal responsive to the externally generated control signal.

6. The flexible system as set forth in claim 2, wherein the system modules of the flexible system are connected together by a protocol interface.

7. The flexible system as set forth in claim 6, wherein the system modules of the flexible system further include system configuration means for generating system configuration signals to a master system module, wherein the system configuration signals include a DISCONNECT signal, to indicate that the system module is in a standalone mode, and a RECONNECT signal, to indicate that the system module is in a slave mode.

8. The flexible system as set forth in claim 7, wherein the system protocol interface is Small Computer Systems Interface (SCSI).

* * * * *